United States Patent [19]
Genheimer

[11] Patent Number: 5,784,219
[45] Date of Patent: Jul. 21, 1998

[54] DUAL SERVO FORMAT FOR OPTIMUM FORMAT EFFICIENCY AND OFF-TRACK DETECTION

[75] Inventor: Stephen R. Genheimer, Mustang, Okla.

[73] Assignee: Seagate Technology, Inc., Scotts Valley, Calif.

[21] Appl. No.: 669,223

[22] Filed: Jun. 24, 1996

Related U.S. Application Data

[60] Provisional application No. 60/008,804, Dec. 14, 1995.
[51] Int. Cl.$^6$ ............................................. G11B 5/596
[52] U.S. Cl. ................................. 360/77.08; 360/48
[58] Field of Search .................................. 360/77.08, 48, 360/49, 77.05, 77.02, 75, 78.14

[56] References Cited

U.S. PATENT DOCUMENTS

| | | | |
|---|---|---|---|
| 4,656,538 | 4/1987 | Mattson | 360/77.08 |
| 4,669,004 | 5/1987 | Moon et al. | 360/77.08 X |
| 5,381,281 | 1/1995 | Shrinkle et al. | 360/77.08 |
| 5,459,623 | 10/1995 | Blagaila et al. | 360/77.08 |

*Primary Examiner*—Andrew L. Sniezek
*Assistant Examiner*—James L. Habermehl
*Attorney, Agent, or Firm*—Kinney & Lange, P.A.

[57] ABSTRACT

In a medium having data fields and servo fields, a dual servo format includes a plurality of large and small servo fields for determining the position of a transducer over the medium. The large servo fields have a circumferential length that is larger than the circumferential length of the small servo fields. Both types of servo fields are distributed across the medium among the data fields.

16 Claims, 5 Drawing Sheets

DUAL SERVO FORMAT FOR OPTIMUM FORMAT EFFICIENCY AND OFF-TRACK DETECTION

This application claims the priority benefits of U.S. Provisional application Ser. No. 60/008,804 filed Dec. 14, 1995.

BACKGROUND OF THE INVENTION

The present invention relates to a servo control system for determining a transducer's position over a storage medium. In particular, the present invention relates to a dual servo format for servo information stored on a medium.

A common medium for storing digital information is a rotatable disc. Information is stored on a disc in concentric tracks that are divided into sectional pieces known as sectors. To store and retrieve data from a disc, a transducer must be positioned over the track and sector designated for the data. This is typically accomplished using a closed-loop servo system that moves the transducer towards the desired location while monitoring the transducer's position.

One such closed-loop system is Mattson, U.S. Pat. No. 4,656,538, which uses a toothed wheel and servo patterns to monitor the transducer's position. The toothed wheel rotates on the same axis as the disc and each tooth represents a sector on the disc. The servo patterns are magnetic transitions located in servo fields written on the disk as spokes radiating from the center of the disc. The servo patterns provide track position information that is combined with the sector information from the toothed wheel to calculate the position of the transducer.

The Mattson system does not read an absolute track position; only a relative track position. It identifies the transducer's track position by comparing the current servo pattern to the preceding servo pattern. The differences between the patterns tell the system how far the transducer moved between the two servo fields. Using the transducer's position at the preceding servo field and the distance the transducer moved between fields, Mattson calculates the transducers position in the current servo field.

This system of calculating a relative track position is complicated by the fact that the Mattson servo patterns repeat every two tracks. The pattern found at the center of track X is identical to the patterns found at the centers of tracks X+2, X+4, X+6 ... and X+2Y, where X and Y are integers. If a transducer does not move radially between servo fields it will read the same servo pattern it would have read if it had moved two tracks. Since Mattson relies on the servo pattern to determine the position of the transducer, the similarity in the patterns and the lack of absolute track position information can result in the servo system miscalculating the position of the transducer. The system can believe it is over track X when it is actually over track X+2. This type of miscalculation is most likely to occur when the system is affected by an external shock that moves the transducer more than the system anticipates.

To try to control this type of miscalculation, Mattson attempts to limit radial movement between servo fields to less than two tracks. Although this provides better control over the transducer, it decreases the system's ability to reach distant tracks quickly.

To overcome these limitations, the art has developed absolute position information that is stored in track and sector identification fields within servo fields on the disc. These fields include digital information that identifies the track and sector the transducer is over. In order to decode the information, the servo fields also include automatic gain control and synchronization fields that are used to set the read amplitude and read frequency needed to successfully interpret the information. Although servo formats that include this added information take more space on the disc than the Mattson servo formats, they actually increase data density by permitting more accurate positioning of the transducer. The data density increases because track widths can be reduced if the transducer can be more accurately positioned and a reduction in track width means an increase in track density.

The increase in track densities has made disc drive systems more susceptible to shock events that can displace the transducer between servo regions. These shock events can move the transducer outside of its current track and into the next track before reaching the next servo region. With increased densities, even a small shock event can cause the transducer to jump tracks. If this occurs, the disc drive may not detect the movement soon enough to prevent data from being written to or read from the wrong track.

One method to reduce off-track errors due to shock events is to increase the frequency of servo regions around the disc. This method is generally avoided because adding servo regions with track identification and servo identification fields greatly reduces the amount of data that can be stored on the disc. The large amount of space these servo regions occupy reduces the space that could otherwise be used by data fields.

SUMMARY OF THE INVENTION

The present invention is a dual servo format for determining the position of a transducer over a medium having data fields and servo fields. The dual servo format includes two types of servo fields, large servo fields and small servo fields.

Each large servo field has a track identification field, a sector identification field, a synchronization field and fine position burst fields. The track identification field and the sector identification field provide absolute position information about the track and sector the transducer is over. The synchronization field provides a synchronization signal that is used to decode the track and sector information in the servo field and data in the data field. The fine position burst fields provide information about the transducer's position within a track. In preferred embodiments, each large servo field has four separate fine position burst fields, A, B, C, and D.

The small servo fields have much less servo information than the large servo fields. In general, the small servo fields do not have synchronization fields, and they never have track identification or sector identification fields. In addition, the small servo fields generally do not have all four fine position burst fields. Instead, they only have burst fields A and B, which are used to determine the transducer's position near the center of a track.

In preferred embodiments, the servo fields are separated from each other by data fields and the large and small servo fields appear in alternating servo positions. This creates a circumferential pattern of fields that is read by the transducer as: data field, large servo field, data field, small servo field, data field, large servo field, etc.

In the present invention the large servo fields are used during track seek operations to initially position the transducer over a track. The small servo fields are used in conjunction with the large servo fields to keep the transducer centered on a track during read and write operations. As described below, the combination of servo fields dramatically increases the disc drive's ability to control the transducer during shock events without significantly impairing the data efficiency of the disc drive.

DETAILED DESCRIPTION OF THE PREFERRED EMBODIMENTS

Figure 1:
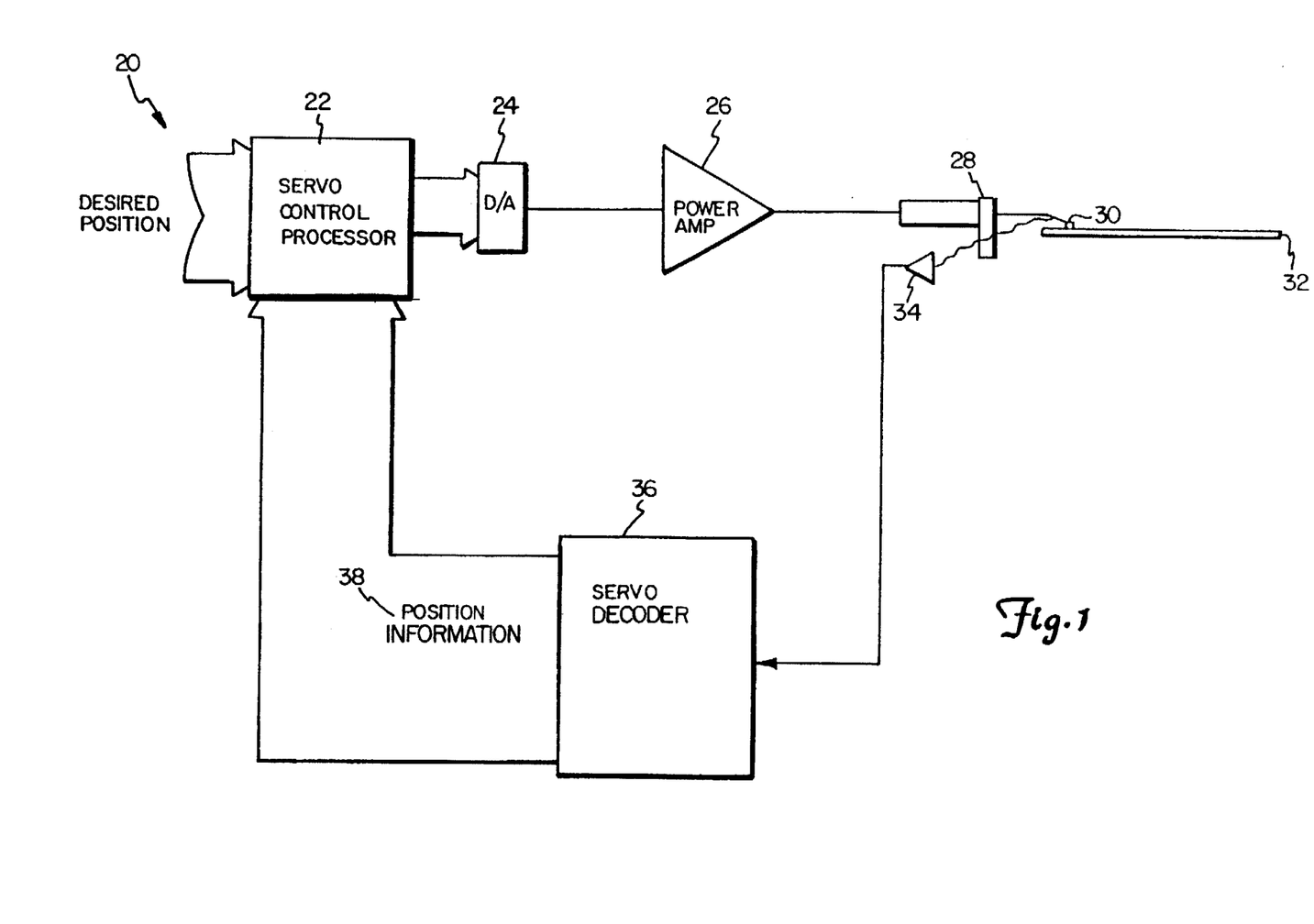
FIG. 1 is a block diagram of a servo system of the present invention.

FIG. 1 is a block diagram of a closed-loop servo control system 20. Servo control system 20 controls and monitors the position of a transducer 30 relative to a rotating disc 32. Servo control system 20 receives binary information representative of a desired transducer position from a processor located elsewhere in the disc drive. The desired-position information is input to servo control processor 22, which monitors the position of transducer 30 at all times. Upon receiving the desired-position information, servo control processor 22 calculates the distance from the transducer's current position to the desired position. It then produces a binary signal related to the direction and distance transducer head 30 must move to reach the desired position. This binary signal is input to digital-to-analog convertor 24 which converts the binary signal into a representative analog value. The analog value is amplified by power amp 26 and input into servo motor 28, which moves transducer 30 in response to the amplified signal. Typically, servo motor 28 moves transducer 30 in an arc across the tracks of disc 32.

As transducer 30 and disc 32 move relative to each other, transducer 30 crosses several servo regions on disc 32. As it passes over a servo region, transducer 30 produces read signals which are input to read amplifier 34 producing an amplified signal that is input to servo decoder 36. The information in the amplified signal is decoded by servo decoder 36 producing decoded position information 38 that is fed back to servo control processor 22.

From position information 38, servo control processor 22 calculates the current position of transducer 30. Based on the current position, servo control processor 22 calculates a new direction and distance to move transducer 30 to arrive at the desired position. The system continues to adjust transducer 30 until the transducer reaches the proper position. Once at the proper track, servo control system 20 monitors the position of transducer 30 and adjusts its position to keep it within the track during read and write operations. This track following routine continues until a new desired position is received.

Figures 2, 3:
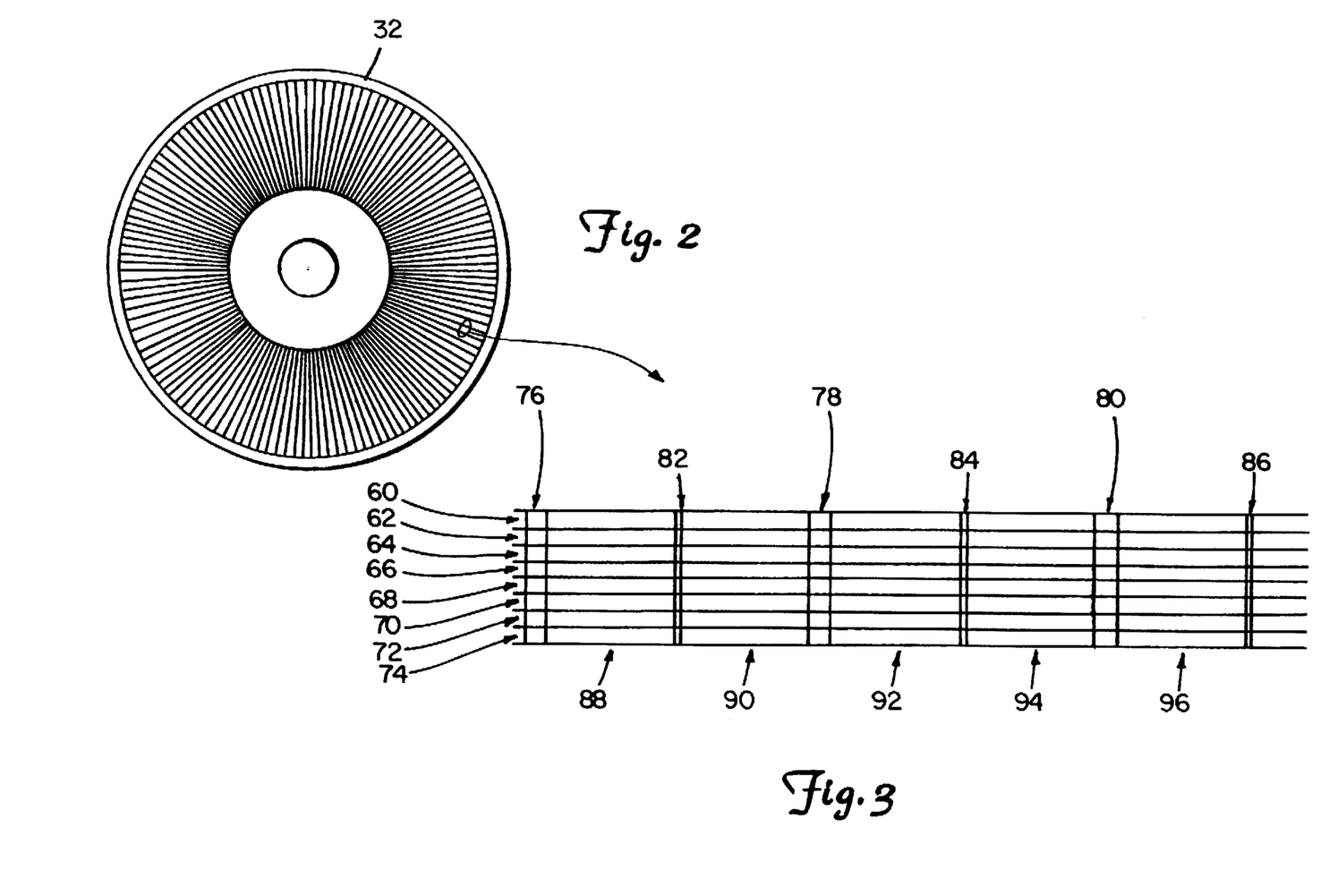
FIG. 2 is a top view of disc 32 of FIG. 1.
FIG. 3 is an expanded view of a portion of disc 32 of FIG. 2 showing the positions of the large and small servo fields of the present invention relative to data fields over a number of tracks.

FIG. 2 is top view of disc 32 of FIG. 1. Disc 32 is preferably a magnetic disc capable of storing magnetic transitions, but may also be an optical disc. The magnetic transitions are preferably stored on concentric tracks (not shown in FIG. 2 for simplicity). The concentric tracks are broken into servo regions and data regions, with the servo regions aligned on the disc in radial spokes that begin at the innermost track and end at the outermost track. On each track, each servo region is separated from each other servo region by a data region. In a preferred embodiment, there are sixty-two servo regions around the disc.

FIG. 3 is an expanded view of a portion of disc 32 of FIG. 2. FIG. 3 shows concentric tracks 60, 62, 64, 66, 68, 70, 72, and 74, which contain along their lengths: large servo fields 76, 78, and 80; small servo fields 82, 84, and 86; and data fields 88, 90, 92, 94, and 96. Large servo fields 76, 78, and 80 include track identification and sector identification information as well as fine position fields, all of which are described further below. Small servo regions 82, 84 and 86 contain less position information than the large servo regions but at least contain some fine position fields. Data fields 88, 90, 92, 94, and 96 contain transitions representing data and other binary values. The data written to each data field falls within the center of the tracks and does not cross track boundaries. In addition to data, the data fields may contain header regions that describe the location and length of the data stored in the particular data field.

In operation, servo control system 20 uses read signals from large servo fields 76, 78, and 80 while moving the transducer from one track to another. During this process, control system 20 reads the track identification and sector identification information found in the large servo fields to determine the transducer's current track and sector.

Once the transducer has arrived at the desired track, the control system enters the track following mode, attempting to keep the transducer centered within the track. Because of various mechanical forces, the transducer can be forced off-track from time to time. To measure the transducer's position within the track, control system 20 uses read signals from both the large servo fields and the small servo fields. For this purpose, the track identification and sector identification information is not as important as the fine position fields. If control system 20 detects that the transducer has moved from the center of a track, the system will adjust the transducer's position to correct the position error.

Figure 4:
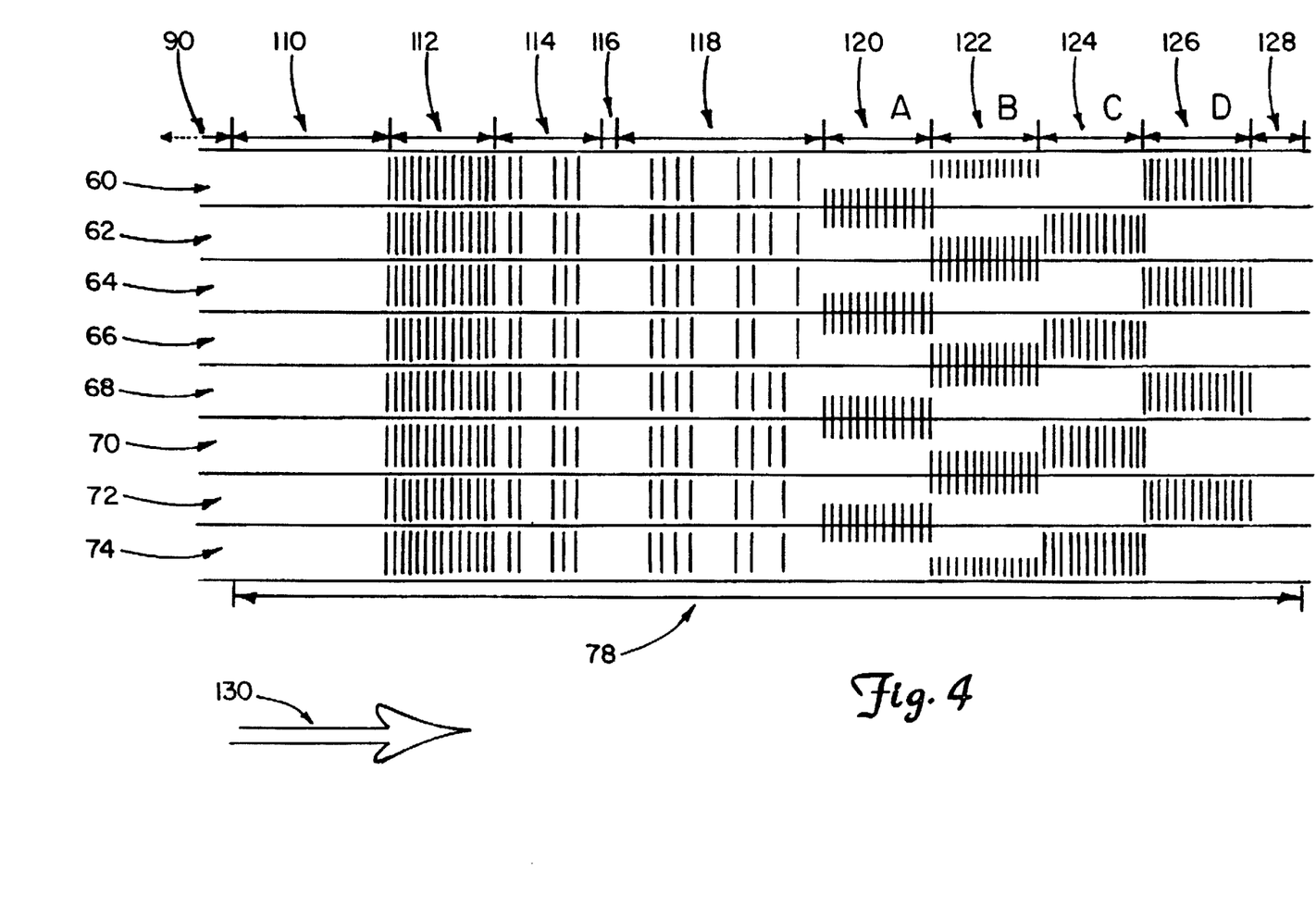
FIG. 4 is an expanded view of large servo field 78 of FIG. 3.

FIG. 4 is an expanded view of large servo field 78 of FIG. 3. Direction arrow 130 shows the general direction transducer 30 travels over large servo field 78. Transducer 30 enters large servo field 78 from data region 90 at lead fill area 110. Lead field area 110 is empty, and is used as an indicator that the data region has ended and the servo region has begun.

After lead fill area 110 is Phase-Locked Oscillator and Automatic Gain Control (PLO/AGC) synchronization 112. PLO/AGC synchronization 112 contains a constant frequency of magnetic transitions. This constant frequency is used by servo decoder 36 to set a phase-locked oscillator to the expected frequency of the digital information stored in the servo field and the data field. The frequency of the phase-locked oscillator is used by decoder 36 to determine when to expect the next data bit. PLO/AGC synchronization 112 is also used to set the gain of the read amplifier so that the amplitude of the read signal is sufficient to retrieve data from the disc.

Abutting PLO/AGC synchronization 112 is index/sector identification field 114 which contains transitions representing the sector identification of the data sector after large servo field 78. In FIG. 4, the binary information stored in index/sector identification 114 is identical for all the tracks shown because large servo field 78 comes before the same sector in all the tracks shown. However, the index/sector identification found in large servo field 76 and large servo field 80 would differ from each other and from index/sector identification 114 because they each come before different sectors. In some embodiments, only one large servo field on the disc has an index/sector identification field. In these embodiments, the index/sector field marks the first sector on the disc. A sector count is then incremented with each new servo field to keep track of the sector the transducer is over.

EG section 116 is a blank section after index/sector identification 114. EG section 116 is an Erase Gap that marks the end of index/sector identification 114 and the beginning of track identification 118.

Track identification 118 follows EG 116 and contains encoded information that identifies the track as being one of two adjacent tracks. In FIG. 4, four pairs of tracks are shown, each pair having a unique track identification code. Specifically, tracks 60 and 62 have a first track identification code; tracks 64 and 66 have a second track identification code; tracks 68 and 70 have a third track identification code; and tracks 72 and 74 have a fourth identification code. Since two adjacent tracks share the same track identification, track identification 118 can only be used to determine that transducer 30 is over a set of two tracks. It can not be used alone to determine where the transducer is within those two tracks.

To position the transducer within the two tracks identified by track identification 118, servo control processor 22 uses fine position fields 120, 122, 124, and 126, commonly referred to as A-burst, B-burst, C-burst, and D-burst respectively. Each fine position field is comprised of radial bands of transitions and no transitions. The bands of transitions and no transitions are both approximately one track wide. The bands of transitions in C-burst 124 and D-burst 126 are centered upon the center line of alternating tracks so that a band of transitions in C-burst 124 is centered on a first track and a band of transitions in D-burst 126 is centered on an adjoining track. For instance, a band of transitions in C-burst 124 is centered on track 70, and a band of transitions in D-burst 126 is centered on adjoining track 72. The bands of transitions in A-burst 120 and B-burst 122 are centered upon the boundary between alternating tracks. Thus, a band of transitions in A-burst 120 is centered upon the boundary between tracks 68 and 70 and a band of transitions in B-burst 122 is centered upon the boundary between tracks 70 and 72.

The radial offset between the four fine position fields allows servo control processor 22 to determine the position of the transducer within any two tracks. The offset creates a unique pattern of read signals for each concentric path over the two tracks because the amplitude of the read signal from each fine position field depends on the transducers proximity to the center of a band of transitions in each field. For instance, if the transducer is travelling along the center of track 66 it would pass over half of a band of transitions in A-burst 120, half of a band of transitions in B-burst 122, all of a band of transitions in C-burst 124 and no part of a band of transitions in D-burst 126. This would create a read signal with half amplitude for A-burst 120 and B-burst 122, full amplitude for C-burst 124 and no amplitude for D-burst 126. If the transducer were moved radially inward towards track 68 it would begin to read less of A-burst 120 and C-burst 124 and more of B-burst 122 and D-burst 126. Thus, the pattern of read signal amplitudes changes as the transducer moves within the two tracks. In practice, A-burst 120 and B-burst 122 are used to position the transducer within a track and C-burst 124 and D-burst 126 are used to position the transducer as it moves between tracks.

The last portion of large servo field 78 is back-fill 128, an area without transitions, indicating that the data region is about to begin.

Figure 5:
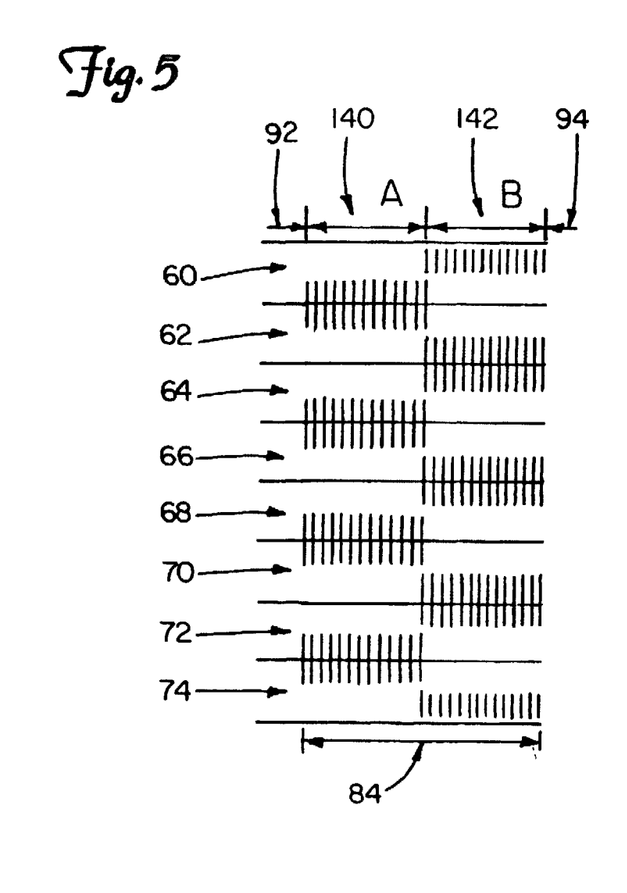
FIG. 5 is an expanded view of small servo field 84 of FIG. 3.

FIG. 5 is an expanded diagram of one embodiment of small servo field 84. In the embodiment shown in FIG. 5, small servo field 84 has two sections: fine position field A-burst 140 and fine position field B-burst 142. Small servo field 84 does not have a PLO/AGC synchronization field, a sector identification field, nor a track identification field. Because of this, small servo field 84 is much shorter than large servo field 78. Specifically, at a preferred disc rotation speed of 7200 revolutions per minute, it takes 16 microseconds for the transducer to travel across a large servo field. However, at the same speed, the transducer can pass over small servo field 84 in 3.2 micro-seconds.

Fine position field A-burst 140 and fine position field B-burst 142 are identical to A-burst 120 and B-burst 122 found in large servo field 78. Fine position fields A-burst 140 and B-burst 142 are used to position the transducer near the center of a track during track following operations. Such operations usually occur after the transducer has been positioned over a track using large servo fields such as large servo field 78 of FIG. 4.

Figure 6:
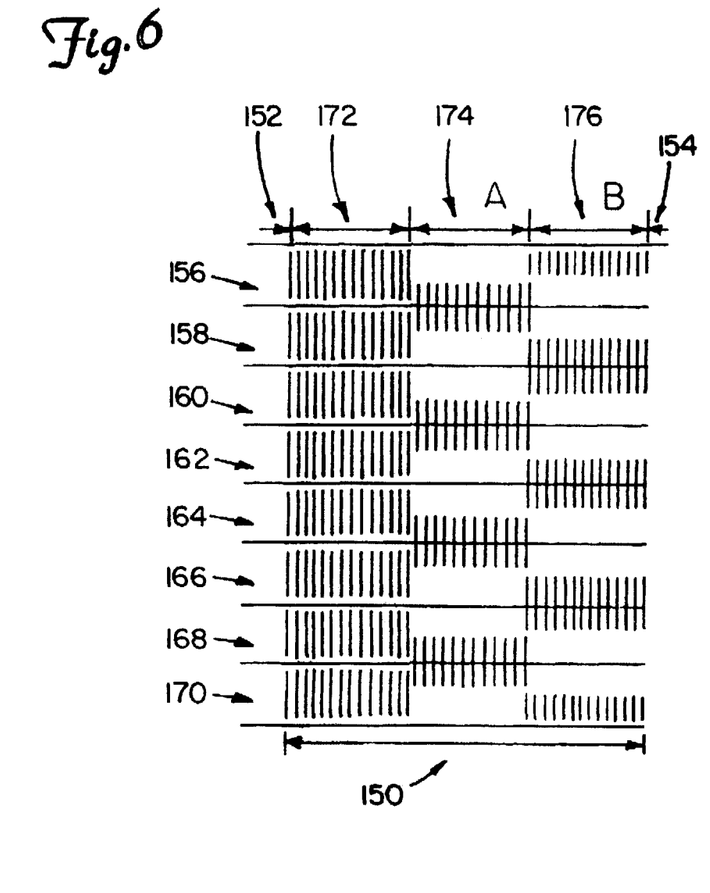
FIG. 6 is an expanded view of a small servo field of the present invention with an AGC/SYNCH field.

FIG. 6 is a second embodiment of a small servo field used in the present invention. In FIG. 6, small servo field 150 lies between two data fields, 152 and 154. Small servo field 150 is depicted over a span of eight tracks denoted as tracks 156, 158, 160, 162, 164, 166, 168, and 170. Within small servo field 150, are fine position field A-burst 174 and fine position field B-burst 176 which are identical to fine position fields A-burst 140 and B-burst 142 of FIG. 5. In addition, small servo field 150 contains Phase Locked Oscillator/Automatic Gain Control (PLO/AGC) synchronization field 172 which is similar to PLO/AGC synchronization field 112 found in large servo field 78 of FIG. 4. PLO/AGC synchronization field 172 is included in small servo field 150 if the frequency and amplitude settings of the servo control system begin to deteriorate between the large servo fields. The addition of PLO/AGC synchronization field 172 in small servo field 150 recalibrates the Phased-Locked Oscillator and the Automatic Gain Control to improve the reading and writing performance of the transducer. At a preferred disc rotation speed of 7200 revolutions per minute, it takes 4.8 micro-seconds for the transducer to pass over small servo field 150. Other than the addition of PLO/AGC synchronization field 172, small servo field 150 functions in an identical manner to small servo field 84.

Figure 7A:
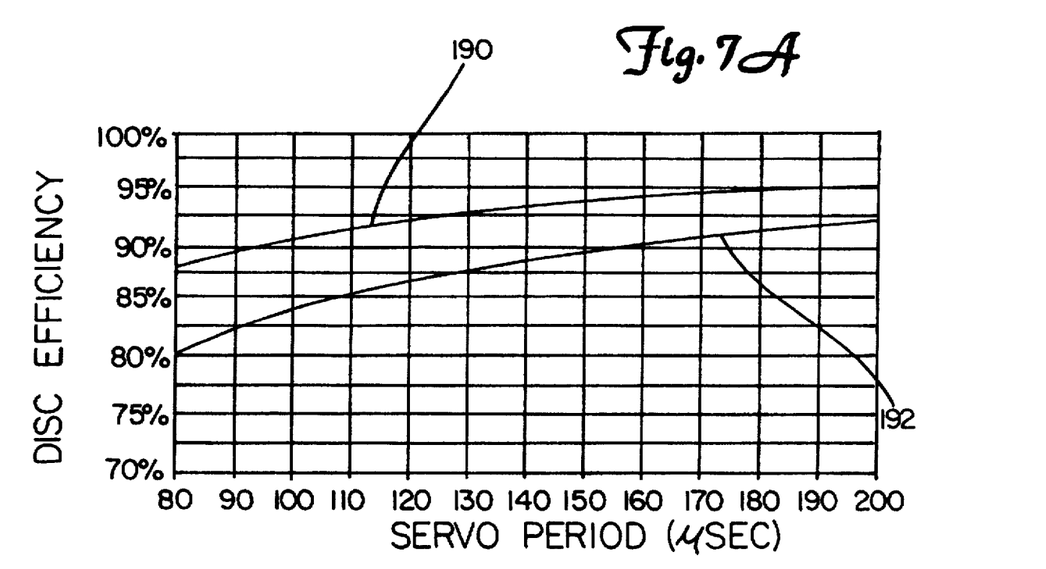
FIG. 7A is a graph of disc efficiency versus the period between servo fields.

FIG. 7 is a graph depicting the cost/benefit of increasing the number of servo regions on a disc. FIG. 7A shows a graph of format efficiency as a function of the servo sample period. The format efficiency is the percent of the disc filled with data and other non-servo information. Higher percentages of data create better format efficiencies. The servo sample period is the amount of time between successive servo regions on the disc while the disc is rotating at 7200 revolutions per minute. In FIG. 7A, the servo sample rate is measured in micro-seconds.

Trace 190 of FIG. 7A is a graph of format efficiency as a function of servo sample period for a dual servo format of the present invention. The dual servo format alternates large and small servo fields as shown in FIG. 4. Trace 192 is a graph of format efficiency as a function of servo sample period for a servo format containing only large servo fields; a format common in prior art servo systems.

FIG. 7A shows that substituting a dual servo format (Trace 190) for a prior art servo format (Trace 192) increases the format efficiency of the disc. The increase in efficiency is due to the fact that a small servo field, such as small servo field 84 shown in FIG. 5, takes less space on the disc than a large servo field, such as servo field 78 of FIG. 4. Substituting small servo fields for some of the large servo fields creates more data space on the disc, as long as the servo sample period remains constant.

Instead of increasing data space, the dual servo format of the present invention can be used to reduce the time between servo regions while maintaining current format efficiencies. For example, in prior art systems, a servo sampling period of 180 micro-seconds is associated with a format efficiency of approximately 91%. By changing to a dual servo format, the servo sample period can be decreased to 90 micro-seconds with only a 2% drop in format efficiency. A servo pattern with a sample period of 90 micro-seconds has twice as many servo fields as one with a sample period of 180 micro-seconds. Thus, the conversion to a dual servo format doubles the number of servo fields while maintaining a format efficiency of 89% (91%-2%). In a standard format, increasing the frequency of servo regions in this manner would result in a format efficiency of only 82.5%; a decrease of nearly 10%.

Figure 7B:
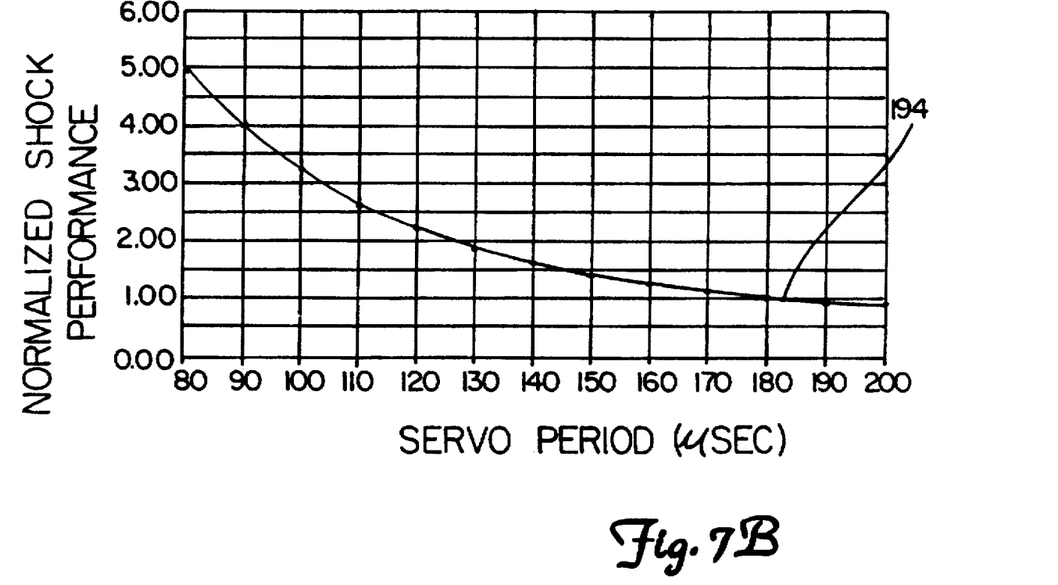
FIG. 7B is a graph of shock performance versus the period between servo fields.

FIG. 7B is a graph of normalized shock performance as a function of servo sample period. The servo sample period is identical to the servo sample period shown for FIG. 7A The normalized shock performance is a measure of the amount of radial movement the head experiences between servo regions for a given shock force applied to the disc drive. Larger shock performance values correspond to less off-track errors.

The graph in FIG. 7B shows that decreasing the time between servo fields increases the shock performance of the disc drive. Reducing the time between servo fields gives the transducer less time to move out of position before the control system can sense and correct the transducer's position. The shock performance is not effected by the type of servo format used on the disc. Thus, the standard servo format of the prior art and the dual servo format of the present invention have the same shock performance.

The relationship between shock performance and time shown as trace 194 in FIG. 7B can be derived from Newtonian physics wherein the distance, s, an object travels due to an acceleration, a, is equal to one-half the acceleration, multiplied by the period of acceleration, t, squared ($s=0.5at^2$). Since shock performance is a measure of the amount of acceleration needed to displace a transducer from a track, it is proportional to acceleration over distance, or $1/t^2$. In terms of disc drives with servo regions, the period for acceleration, t, is equal to the time period between servo regions. Thus, if the time between servo regions is reduced by half, the time period for accelerating the head is reduced by half. Since shock performance is proportional to $1/t^2$, a one-half reduction in t results in a factor of 4 increase in shock performance. This relationship is shown in FIG. 7B where shock performance has been normalized at a servo sample period of 180 micro-seconds. In the graph, the shock performance increases from 1 to 4 as the servo sample period is reduced in half, from 180 micro-seconds to 90 micro-seconds.

FIGS. 7A and 7B show the advantages of the present invention. By converting a disc to a dual servo format, the period between servo fields can be reduced to increase shock performance without causing an unwanted reduction in format efficiency. For instance, the format efficiency for a standard servo format at a servo sample rate of 180 micro-seconds is 91%. This format efficiency can be maintained with the dual servo format of the present invention at a servo sample rate of 110 micro-seconds. Since this reduced sample rate produces a normalized shock performance that is 2.7 times greater than the shock performance of the standard format at 180 micro-seconds, the dual format increases shock performance without affecting format efficiency.

Those skilled in the art will recognize that different servo sample periods may be used with the dual servo format of the present invention to achieve a desired balance between format efficiency and shock performance. Those skilled in the art will also recognize that although only one small servo field has been shown between the large servo fields, additional small servo fields may be placed between the large servo fields within the scope of the present invention.

Although the present invention has been described with reference to preferred embodiments, workers skilled in the art will recognize that changes may be made in form and detail without departing from the spirit and scope of the invention.

What is claimed is:

1. A dual servo format for determining a position of a transducer over a medium having a plurality of tracks containing data fields, and a plurality of servo fields distributed across the medium and among the data fields, the format comprising:

a plurality of large servo fields, each large servo field having a first length and containing at least a track identification field for reading by the transducer to identify a set of tracks and a plurality of radially offset servo fine positioning bursts arranged in a first pattern for reading by the transducer to identify a radial position of the transducer within the set of tracks; and plurality of small servo fields, each small servo field having a second length smaller than the first length and containing a plurality of radially offset servo fine positioning bursts arranged in a second pattern for reading by the transducer to identify a radial position of the transducer within the set of tracks, each small servo field not containing a track identification field, the second pattern being different from the first pattern.

2. The dual servo format of claim 1, wherein each set of tracks consists of two tracks.

3. The dual servo format of claim 2, wherein the first pattern comprises at least four servo bursts arranged so that a first of the bursts of the first pattern is centered on a first track of the set, a second of the bursts of the first pattern is centered on the second track of the set, a third of the bursts of the first pattern is centered so that equal portions of the third bursts are on a radially outer edge of the first track of the set and on a radially inner edge of the second track of the set, and a fourth of the bursts of the first pattern is centered so that equal portions of the fourth burst are on a radially outer edge of the second track of the set and a radially inner edge of a first track of an adjacent set of tracks, and the second pattern comprises at least two servo bursts centered to match two of the bursts of the first pattern.

4. The dual servo format of claim 1, wherein at least one small servo field and two data fields are angularly between two large servo fields.

5. The dual servo format of claim 1, wherein the second pattern comprises fewer servo bursts than the first pattern.

6. In a computer disc drive, a method for determining positions of a transducer over a disc having a plurality of concentric tracks, each track containing a plurality of data fields, at least one full servo region distributed among the data fields, each full servo region having a first length and containing at least a track identification field for reading by the transducer to identify a set of tracks comprising the respective track and at least one radially adjacent track, each full servo region further containing a plurality of radially offset servo fine positioning bursts arranged in a first pattern for reading by the transducer to identify a radial position of the transducer within the set of tracks, and a plurality of minimum servo regions, each minimum servo region having a second length smaller than the first length and containing a plurality of radially offset servo fine positioning bursts arranged in a second pattern for reading by the transducer to identify a radial position of the transducer within the set of tracks, each minimum servo region not containing a track identification field, the second pattern being different from the first pattern, the method comprising:

passing the transducer over a full servo region to read the track identification field to identify the set of tracks confronting the transducer and to read the first pattern of fine positioning bursts create an absolute position signal representative of the radial position of the transducer within the identified set of tracks;

determining the position of the transducer over the full servo region based upon the absolute position signal;

subsequently passing the transducer over a minimum servo region to read the second pattern of fine positioning bursts to create a relative position signal representative of the radial position of the transducer within the identified set of tracks; and determining the position of the transducer over the minimum servo region based upon the relative position signal and the identified set of tracks.

7. In a disc drive for storing and reading digital values, the disc drive comprising:

a transducer;

a disc, having a plurality of concentric tracks containing data regions, a plurality of servo fields distributed across the medium and among the data fields, the servo fields being arranged in a format comprising:

a plurality of large servo regions, each large servo field having a length and containing at least a track identification field for each track for defining an absolute position of a set of tracks on the storage medium and a plurality of radially offset fine positioning servo bursts arranged in a first pattern for reading by the transducer to identify a radial position of the transducer within the set of tracks, and a plurality of small servo regions, each small servo field having a length smaller that the length of a large servo region and containing a plurality of radially offset servo bursts arranged in a second pattern for reading by the transducer to identify a radial position of the transducer within the set of tracks, the second pattern of servo bursts being different from the first pattern of servo bursts, each small servo field not containing a track identification field; and the transducer reading the data regions to generate data signals, the transducer reading large servo regions to generate large-servo signals representative of the identification of the set of tracks confronting the transducer and the radial position of the transducer within the set of tracks, and the transducer reading the small servo regions to generate small-servo signals representative of the radial position of the transducer within the set of tracks; and a servo mechanism, for moving the transducer across the disc, the servo mechanism capable of receiving the large-servo signals and small-servo signals from the transducer, the servo mechanism capable of using the large-servo signals to determine the transducer's location over a large servo region and capable of indirectly determining the transducer's location over a small servo region by evaluating the small-servo signals relative to the large-servo signals.

8. The disc drive of claim 7, wherein each set of tracks consists of two tracks.

9. The disc drive of claim 8, wherein the first pattern comprises at least four servo bursts arranged so that a first of the bursts of the first pattern is centered on a first track of the set, a second of the bursts of the first pattern is centered on the second track of the set, a third of the bursts of the first pattern is centered so that equal portions of the third bursts are on a radially outer edge of the first track of the set and on a radially inner edge of the second track of the set, and a fourth of the bursts of the first pattern is centered so that equal portions of the fourth burst are on a radially outer edge of the second track of the set and a radially inner edge of a first track of an adjacent set of tracks, and the second pattern comprises at least two servo bursts centered to match two of the bursts of the first pattern.

10. The disc drive of claim 7, wherein at least one small servo field and two data fields are angularly between two large servo fields.

11. The disc drive of claim 7, wherein the second pattern comprises fewer servo bursts than the first pattern.

12. A storage medium having a plurality of tracks containing data fields for storing data in a format readable by a transducer confronting the medium, the storage medium further having a plurality of servo fields distributed across the medium and among the data fields, the servo fields being arranged in a format comprising:

a plurality of large servo regions, each large servo field having a length and containing at least a track identification field defining an absolute position of a set of tracks on the storage medium, and a plurality of radially offset fine positioning servo bursts arranged in a first pattern for reading by the transducer to identify a radial position of the transducer within the set of tracks; and a plurality of small servo regions, each small servo field having a length shorter than the length of a large servo region and containing a plurality of radially offset fine positioning servo bursts arranged in a second pattern for reading by the transducer to identify a radial position of the transducer within the set of tracks, the second pattern of servo bursts being different from the first pattern of servo bursts, each small servo field not containing a track identification field.

13. The storage medium of claim 12, wherein each set of tracks consists of two tracks.

14. The storage medium of claim 13, wherein the first pattern comprises at least four servo bursts arranged so that a first of the bursts of the first pattern is centered on a first track of the set, a second of the bursts of the first pattern is centered on the second track of the set, a third of the bursts of the first pattern is centered so that equal portions of the third bursts are on a radially outer edge of the first track of the set and on a radially inner edge of the second track of the set, and a fourth of the bursts of the first pattern is centered so that equal portions of the fourth burst are on a radially outer edge of the second track of the set and a radially inner edge of a first track of an adjacent set of tracks, and the second pattern comprises at least two servo bursts centered to match two of the bursts of the first pattern.

15. The storage medium of claim 12, wherein at least one small servo field and two data fields are angularly between two large servo fields.

16. The storage medium of claim 12, wherein the second pattern comprises fewer servo bursts than the first pattern.

* * * * *